United States Patent
Guo et al.

(10) Patent No.: US 12,248,055 B2
(45) Date of Patent: Mar. 11, 2025

(54) REAL TIME OBJECT MOTION STATE RECOGNITION METHOD USING MILLIMETER WAVE RADAR

(71) Applicant: National YANG MING Chiao Tung University, Hsinchu (TW)

(72) Inventors: Jiun-In Guo, Hsinchu (TW); Hung-Yu Liu, Hsinchu (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 373 days.

(21) Appl. No.: 17/658,131

(22) Filed: Apr. 6, 2022

(65) Prior Publication Data

US 2023/0168361 A1    Jun. 1, 2023

(30) Foreign Application Priority Data

Nov. 26, 2021  (TW) ................... 110144263

(51) Int. Cl.
   *G01S 13/58*     (2006.01)
   *G01S 7/40*      (2006.01)
   *G01S 7/41*      (2006.01)

(52) U.S. Cl.
   CPC ............ *G01S 13/588* (2013.01); *G01S 7/403* (2021.05); *G01S 7/415* (2013.01); *G01S 7/417* (2013.01)

(58) Field of Classification Search
   CPC ........ G01S 13/588; G01S 7/403; G01S 7/415; G01S 7/417
   See application file for complete search history.

(56) References Cited

U.S. PATENT DOCUMENTS 9,146,312 B1 *   9/2015  Rush ................. G01S 7/295
2012/0287035 A1 * 11/2012  Valko ................ G06F 1/3231
                                                  713/323
(Continued)

FOREIGN PATENT DOCUMENTS

JP    2013002927 A *  1/2013  .......... G01S 13/867

OTHER PUBLICATIONS

Chmurski et al. "Novel Radar-based Gesture Recognition System using Optimized CNN-LSTM Deep Neural Network for Low-power Microcomputer Platform", Proceedings of the 13th International Conference on Agents and Artificial Intelligence (ICAART), vol. 2, pp. 882-890, Feb. 2021.

(Continued)

*Primary Examiner* — Vladimir Magloire
*Assistant Examiner* — Maxine McKenzie Phillips
(74) *Attorney, Agent, or Firm* — Timothy H. Van Dyke; Wolter Van Dyke Davis, PLLC

(57) ABSTRACT

A method for recognizing a motion state of an object by using a millimeter wave radar having at least one antenna is disclosed. The method includes the following steps. A region is set to select an object in the region, wherein the object has M ranges and M azimuths between the object and the at least one antenna during a first motion time. Each of the M ranges and the M azimuths are projected on a two-dimensional (2D) plane to form M frames. The M frames are sequentially arranged into a first consecutive candidate frames having a time sequence. The first consecutive candidate frames are inputted into an artificial intelligence model to determine a motion state type of the first consecutive candidate frames.

19 Claims, 10 Drawing Sheets

(56) References Cited

U.S. PATENT DOCUMENTS

| | | | |
|---|---|---|---|
| 2015/0220488 A1* | 8/2015 | Healy | G01S 13/84 |
| | | | 702/181 |
| 2018/0172816 A1* | 6/2018 | Chiu | G01S 13/26 |
| 2020/0257902 A1* | 8/2020 | Yao | G06N 3/08 |
| 2020/0319324 A1* | 10/2020 | Au | H04W 48/16 |

OTHER PUBLICATIONS

Dekker et al. "Gesture recognition with a low power FMCW radar and a deep convolutional neural network" 2017 European Radar Conference (EURAD), pp. 163-166, Nuremberg, Germany, Oct. 2017.

Hazra et al. "Short-Range Radar-Based Gesture Recognition System Using 3D CNN With Triplet Loss" IEEE Access, vol. 7, pp. 125623-125633, Aug. 2019.

* cited by examiner

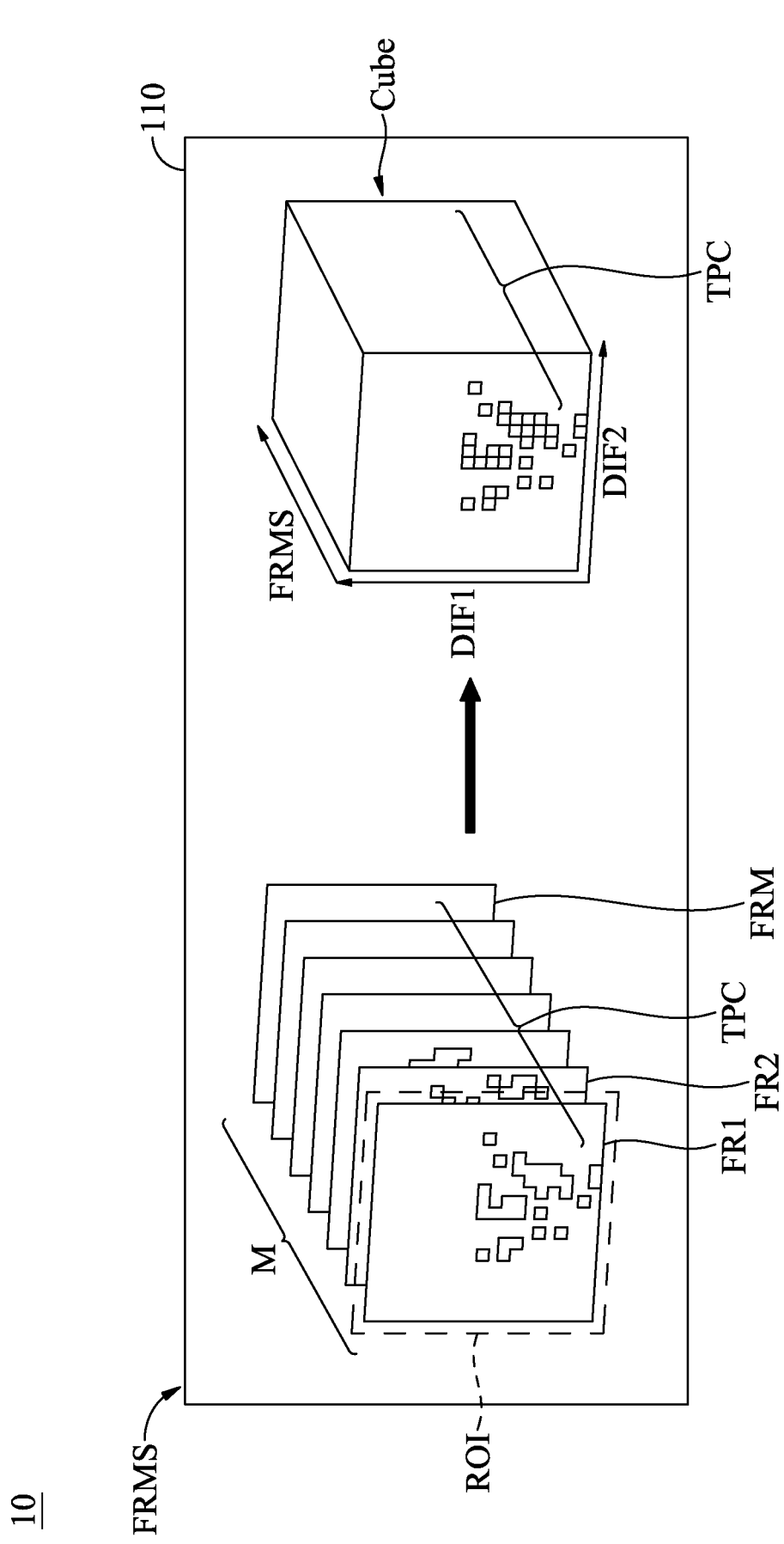

REAL TIME OBJECT MOTION STATE RECOGNITION METHOD USING MILLIMETER WAVE RADAR

CROSS-REFERENCE TO RELATED APPLICATION AND CLAIM OF PRIORITY

The application claims the benefit of Taiwan Application No. 110144263, filed on Nov. 26, 2021, at the TIPO, the disclosures of which are incorporated herein in their entirety by reference.

FIELD OF THE INVENTION

The present invention is related to a method of real-time recognizing an object motion state by using a millimeter wave radar, and particularly is related to a method of real-time recognizing an object motion state by using a millimeter wave radar through an artificial intelligence model.

BACKGROUND OF THE INVENTION

With the evolution of technology, the way of human-machine interaction is continuously changing. People are no longer satisfied with the interactive way of a keyboard, a mouse or a touch screen, and are continuously looking for a more intuitive and humanized human-machine communication bridge in order to provide a better quality of life for people or a safer operating situation.

In the prior art, gesture recognition technology is usually achieved through a photo sensor, such as a camera. However, the photo sensor is easily affected by external ambient light, which may cause difficulty in gesture recognition in an environment that is too bright or too dark. The issue of privacy is also raised when using a high-resolution and powerful photo sensor to capture images of personal bio identifications such as fingerprints. Moreover, the dimension of the image can make the parameters of the neural network model and the amount of computation become extremely large, so it is not easy to be applied to a general embedded platform to achieve real-time gesture recognition.

The use of the radar in gesture recognition can solve the problems faced by using the photo sensor; and the feature map used in the conventional radar gesture recognition is usually the visual frequency spectrum map after the fast Fourier transformation. This kind of visual image has the property of a high dimensionality, and the model used is usually a three-dimensional convolutional neural model or a recurrent neural model. These various factors can lead to a large model, which is not conducive to operation on devices with weak computing power.

In the gesture recognition method and system of patent TWI398818B, a photographic device is used to obtain images that may contain natural gestures. Gesture templates that are most similar to contour fragments are found from gesture template libraries of different angles and categories; and finally the terminal device displays the gesture recognition result. Using a photographic device to obtain images containing natural gestures can easily leak personal privacy information, such as biometric information including person's fingerprints, which leads to information security issues.

B. Dekker, S. Jacobs, A. S. Kossen et al. provide a document "Gesture recognition with a low power FMCW radar and a deep convolutional neural network," 2017 European Radar Conference (EURAD), pp. 163-166, Nuremberg, Germany, October 2017. The technique of the document uses the signal obtained by frequency-modulated continuous wave (FMCW) radar to do digital signal processing in order to obtain a micro-Doppler map, extracts the features of the micro-Doppler map by a convolutional neural network, and categorizes gesture types. This kind of visual image has the property of high dimension, which is not appropriate to operate on devices with relatively weak computing power.

Souvik Hazra and Avik Santra provide a document "Short-Range Radar-Based Gesture Recognition System Using 3D CNN With Triplet Loss," IEEE Access, vol. 7, pp. 125623-125633, August 2019, which uses the objective function of Triplet Loss. This objective function is often used to train samples with small differences. Its purpose is to make the same gesture and its corresponding positive sample closer, and its corresponding sub-sample farther away, so as to achieve less distinguishable difference data. The model used in the identification method is usually a three-dimensional convolutional neural model or a recurrent neural model, which results in a large model and is not conducive to operation on devices with relatively weak computing power.

Mateusz Chmurski and Mariusz Zubert provide a document "Novel Radar-based Gesture Recognition System using Optimized CNN-LSTM Deep Neural Network for Low-power Microcomputer Platform", Proceedings of the 13th International Conference on Agents and Artificial Intelligence (ICAART), vol. 2, pp. 882-890, February 2021, which uses the Convolutional LSTM model for classification. This architecture can string together radar information at different times to complete dynamic gesture recognition. However, it still uses the 3D CNN model to recognize gestures, which increases the complexity of the operation.

SUMMARY OF THE INVENTION

In view of the above limitations, the present invention proposes a system designed by using a radar, which can greatly simplify the development and design of the radar end, can carry out a lightweight design for the neural network, can be implemented in a CPU-based embedded device in real time, and lowers the threshold for implementation on different platforms or devices.

In accordance with one aspect of the present invention, a method of real-time recognizing an object motion state by using a millimeter wave radar is disclosed. The method includes the following steps: detecting an object in response to at least one mixed signal; performing a first processing on the at least one mixed signal to obtain a plurality of frames, each of which has a first feature information and a second feature information and corresponds to a specific time point; inputting the plurality of frames into a two-dimensional (2D) convolution model to extract temporal position features of the object in the plurality of frames; and performing a second processing on the extracted temporal position features to recognize the object motion state by a voting mechanism.

In accordance with one aspect of the present invention, a millimeter wave radar is disclosed. The millimeter wave radar includes at least one antenna, a first processing module, a two-dimensional (2D) convolution model and a second processing module. The at least one antenna is configured to receive at least one mixed signal to detect an object. The first processing module is coupled to the at least one antenna for performing a first processing on the at least one mixed signal to obtain a plurality of frames, each of which has a first feature information and a second feature information and corresponds to a respective time point. The two-dimensional (2D) convolution model is coupled to the first processing module, and receives the plurality of frames to extract temporal position features of the object in the plurality of frames. The second processing module performs a second processing on the extracted temporal position features, wherein the second processing module uses a voting mechanism to recognize an object motion state of the object.

In accordance with one aspect of the present invention, a method for recognizing a motion state of an object by using a millimeter wave radar having at least one antenna is disclosed. The method includes the following steps: A region is set to select an object in the region, wherein the object has M ranges and M azimuths between the object and the at least one antenna during a first motion time. Each of the M ranges and the M azimuths are projected on a two-dimensional (2D) plane to form M frames. The M frames are sequentially arranged into a first consecutive candidate frames having a time sequence. The first consecutive candidate frames are inputted into an artificial intelligence model to determine a motion state type of the first consecutive candidate frames.

The benefits of the present invention are listed as follows:
1. Compared with the scheme of the traditional optical sensor, the scheme of the present invention adopts the sensor of millimeter wave radar to perform gesture recognition, and is less affected by different environmental factors, and can be used in day, night, sunny and rainy days.
2. Considering the range of possible applications, a redesigned lightweight two-dimensional convolutional neural network is used in this invention. This model can greatly reduce the amount of computation and parameters, and then the CPU can run smoothly in embedded devices, so as to achieve real-time motion gesture recognition.
3. In order to reduce the probability of misjudgment in gesture recognition, an objective function commonly used in face recognition is added in the training process, and the vectors are separated in Euclidean space after different gesture classifications so as to achieve the effect of reducing misjudgment.
4. A real-time and lightweight gesture recognition system using a millimeter-wave radar is proposed in the present invention. In order to operate more complex gestures, the vertical and horizontal positions of the detected objects are used as input features which are then classified by using a two-dimensional convolution model that is specially modified and designed for a lightweight gesture recognition system. Therefore, the computational load and power consumption of the deep learning model is reduced without losing its reliability. This invention has extremely high portability, and thus commercial radars that can obtain the location of objects on the market can adopt this invention without difficulties.

The above objectives and advantages of the present invention will become more readily apparent to those ordinarily skilled in the art after reviewing the following detailed descriptions and accompanying drawings, in which:

BRIEF DESCRIPTION OF THE DRAWINGS

FIG. 2 is a schematic diagram showing the visualization of detection objects according to a preferred embodiment of the present invention;

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 1A:
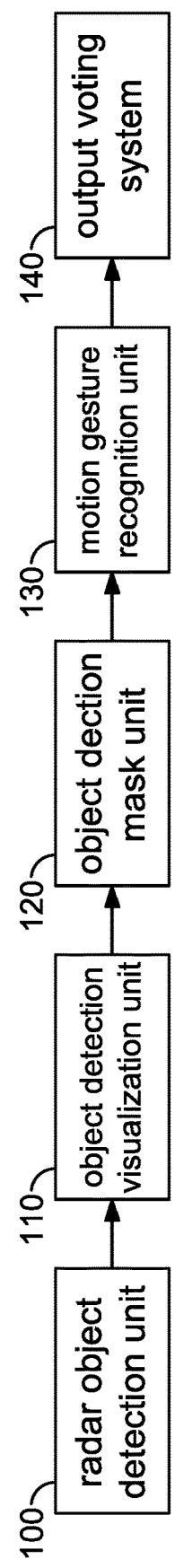
FIG. 1A is a schematic diagram showing a system structure according to a preferred embodiment of the present disclosure.

Please refer to FIG. 1A, which is a schematic diagram showing a system structure 10 according to a preferred embodiment of the present disclosure. The system structure 10 includes a radar object detection unit 100, an object detection visualization unit 110 coupled to the radar object detection unit 100, an object detection mask 120 coupled to the object detection visualization unit 110, a dynamic gesture recognition unit 130 coupled to the object detection mask 120, and an output voting system 140 coupled to the dynamic gesture recognition unit 130.

Figure 1B:
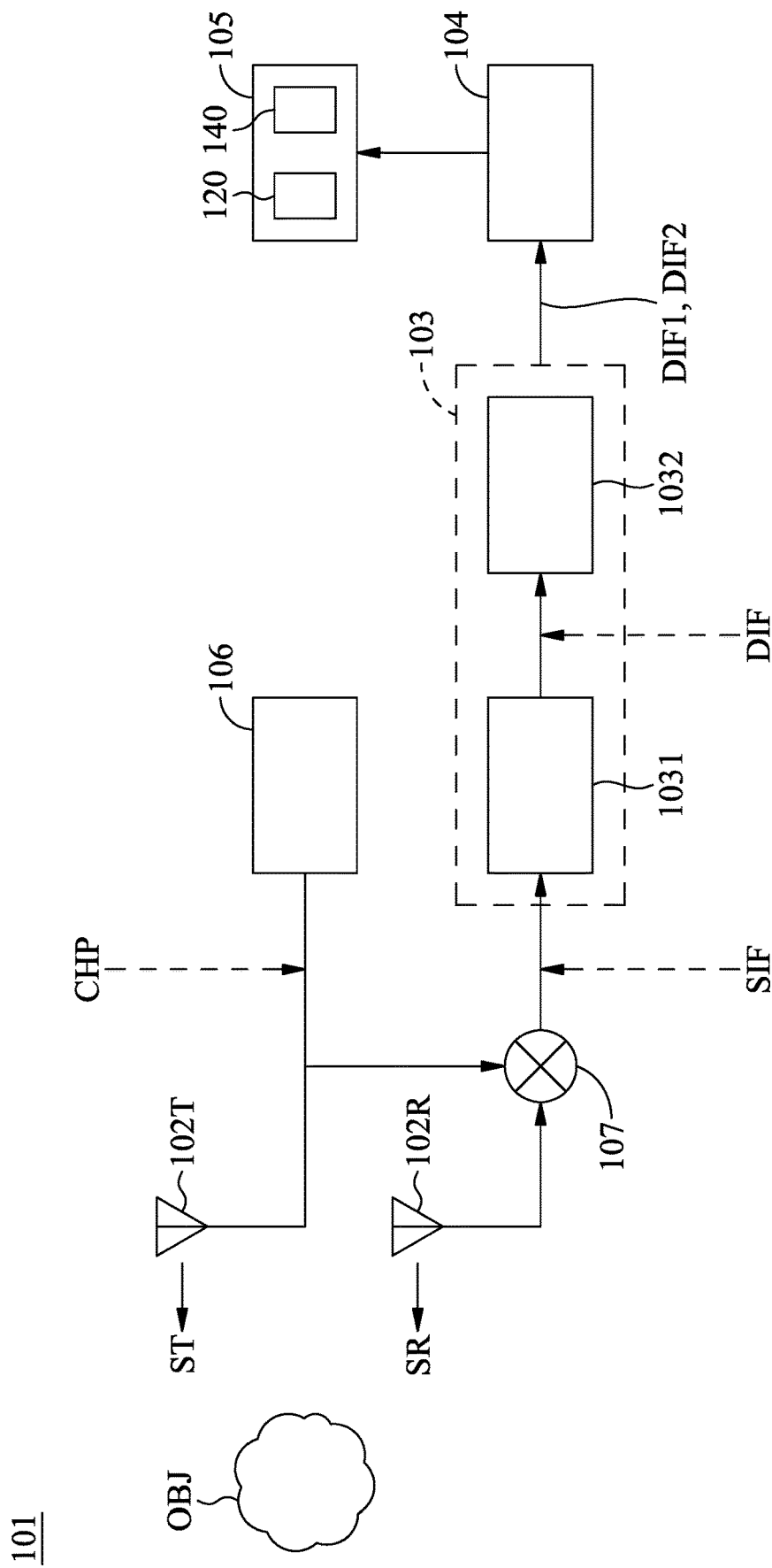
FIG. 1B is a schematic diagram showing a millimeter-wave radar according to a preferred embodiment of the present disclosure.
Figure 3:
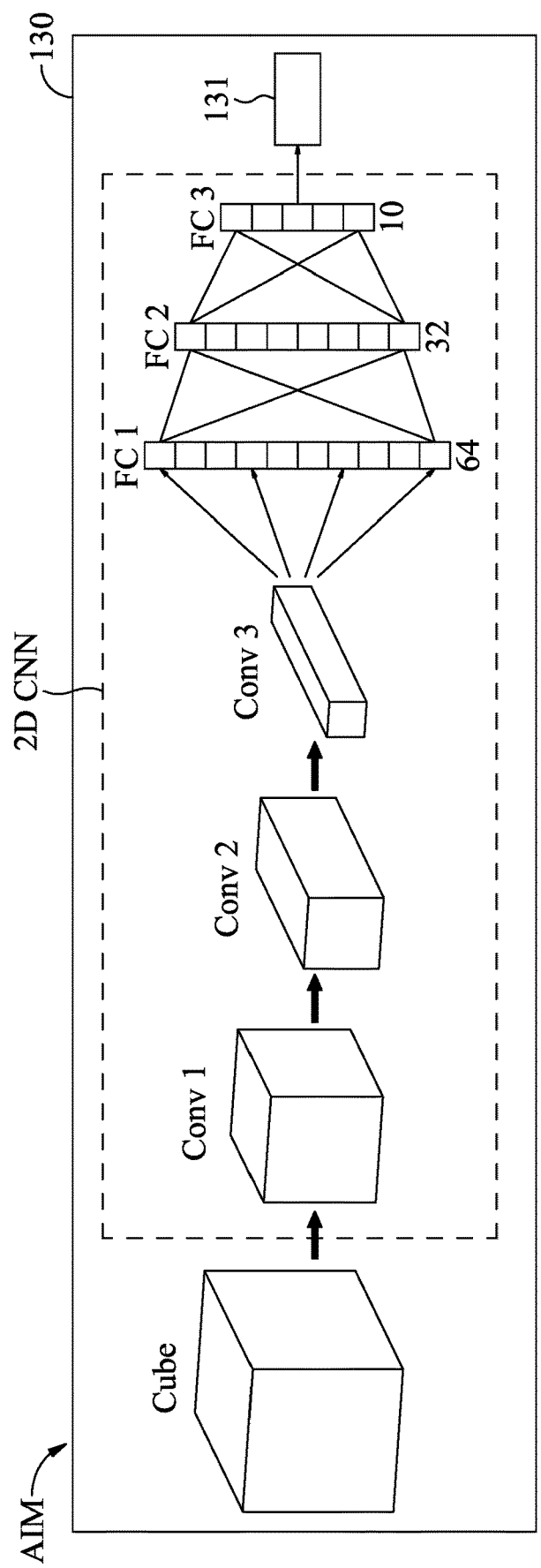
FIG. 3 is a schematic diagram showing a lightweight two-dimensional convolutional network according to a preferred embodiment of the present invention.
Figure 4:
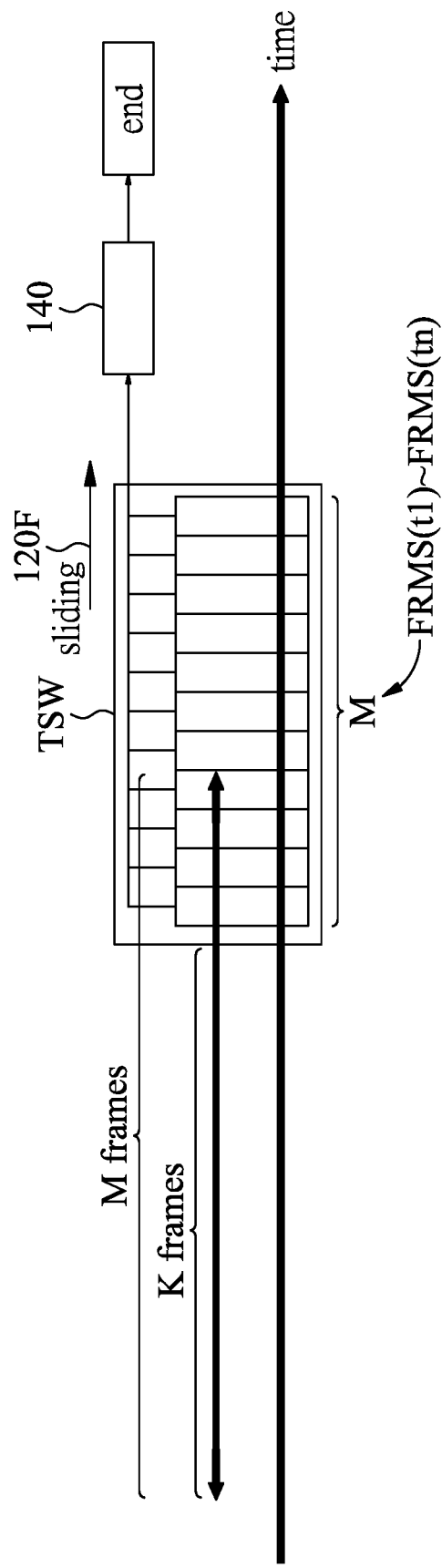
FIG. 4 is a schematic diagram showing an output voting system according to a preferred embodiment of the present disclosure.

The system structure 10 shown in FIG. 1A is, for example, a millimeter-wave radar 101 according to a preferred embodiment of the present disclosure as shown in FIG. 1B. FIG. 2 is a schematic diagram showing the visualization of detection objects according to a preferred embodiment of the present disclosure. FIG. 3 is a schematic diagram showing a lightweight two-dimensional convolutional network 2D CNN according to a preferred embodiment of the present disclosure. FIG. 4 is a schematic diagram showing an output voting system 140 according to a preferred embodiment of the present disclosure. Please refer to FIGS. 1B, 2, 3 and 4. The millimeter wave radar 101 includes at least one antenna 102T, 102R, a first processing module 103, a two-dimensional convolution model 104, and a second processing module 105. The at least one antenna 102T, 102R receives a mixed signal SIF to detect an object OBJ. The first processing module 103 performs a first processing on the mixed signal SIF to obtain a plurality of frames FRMS having a first characteristic information DIF1 and a second characteristic information DIF2. The two-dimensional convolution model 104 receives the plurality of frames FRMS, formed by the first feature information DIF1 and the second feature information DIF2 at different time points, to extract a temporal position feature TPC of the object OBJ in the plurality frames FRMS. The second processing module 105 uses a voting mechanism to recognize a motion state of the object OBJ.

Please refer to FIG. 1B, the second processing module 105 also uses a masking technique 120F (as shown in FIG. 4) to perform a second processing on the extracted temporal position feature TPC, such as temporal sliding window. The at least one antenna 102T, 102R shown in FIG. 1B includes a transmitting antenna 102T and a receiving antenna 102R, which are a group of antennas; and the number of transmitting and receiving antennas can be appropriately arranged. The spacing between the antennas can also be appropriately pre-designed, and the arrangement between the antennas can be horizontal, straight, cross, or a combination thereof. For example, the antenna arrangement represented by 2T4R has a combination of two transmitting antennas 102T and four receiving antennas 102R.

As shown in FIG. 1B, the first processing module 103 can be applied to the object detection visualization unit 110, which can convert the data points of the detected object obtained by the radar object detection unit 100 into a visual image, and combine the visual images of different time points to form an input feature that can be input to the 2D convolution model 104. For example, the 2D convolution model 104 can be applied to the dynamic gesture recognition unit 130.

As shown in FIG. 1B, the first processing module 103 further includes an analog digital conversion unit 1031 and a digital signal processing unit 1032 coupled to the analog digital conversion unit 1031. The analog digital conversion unit 1031 converts the mixed signal SIF into a digital information DIF. The digital signal processing unit 1032 processes the digital information DIF. The mixed signal is, for example, a Frequency Modulated Continuous Wave (FMCW) radar signal, which can be formed by mixing (such as adding, subtracting, etc.) a first periodic sweep-frequency signal and a second periodic sweep-frequency signal. The first periodic sweep-frequency signal is sent by the transmitting antenna 102T; and the second periodic sweep-frequency signal is received by the receiving antenna 102R with a time delay.

As shown in FIG. 1B, the second processing module 105 can be applied to the object detection mask unit 120, which is used for filtering background noise. When the number of detected objects is too rare, the object detection mask unit 120 will filter out data points. This method has two main advantages: one is that it can enter a standby state when there is no gesture to be performed, so as to save unnecessary power consumption of neural network operations; and the other is that the input feature cut method can be made to be similar to a method used when collecting training data, so as to achieve a more accurate gesture recognition effect.

As shown in FIG. 2, the first feature information DIF1 and the second feature information DIF2 shown in FIG. 1B form individual single frames FR1, FR2, ..., FRM, and then the individual single frames FR1, FR2, ..., FRM form a plurality of frames FRMS, that is, the cube as shown in FIG. 2. Then, the cube is used as the input feature to be input into the two-dimensional convolutional network 2D CNN to determine which motion state of the object OBJ belongs to. This determining method can be applied to gesture recognitions.

(Adding for details) As shown in FIG. 2, a first plurality of M frames form a first consecutive candidate frames FRMS(t1) at time t1; a second plurality of M frames form a second consecutive candidate frame FRMS(t2) at time t2; and an nth plurality of M frames form an nth consecutive candidate frame FRMS(tn) at time tn as shown in FIG. 4. After the first plurality of M frames are input into the two-dimensional convolutional network 2D CNN at time t1, then a next frame is input into the two-dimensional convolutional network 2D CNN at time t2, i.e., the second plurality of M frames are input into the two-dimensional convolutional network 2D CNN at time t2, and so on, which is a masking technique including the temporal sliding window 120F. The masking technique can contribute to a real time processing for the first consecutive candidate frames FRMS(t1), the second consecutive candidate frames FRMS (t2), ..., the nth consecutive candidate frames FRMS(tn). Each of the nth consecutive candidate frames FRMS(tn) can be recognized as one candidate gesture by the millimeter wave radar 10 that can identify which candidate gesture has the highest occurrences, so as to recognize a real gesture.

As shown in FIG. 3, the two-dimensional convolution model 104 can be applied to the dynamic gesture recognition unit 130, which is a lightweight two-dimensional convolutional network 2D CNN. For example, in an embodiment of FIG. 3, the cube Cube has 36 temporal series of length*width frames, for example, 16@10*10 represents sixteen 3*3 cores as filters after training by the 2D CNN. After the input cube Cube is subjected to a convolution operation Conv1, a maximum pooling with a core of 2 is performed to obtain a frame of 16@10×10, i.e., length*width=10*10. The screen size and number of cubes and the number and size of cores can be appropriately selected and adjusted. The convolution operations Conv2 and Conv3 are also similar to the convolution operations Conv1, but further extract the time position features of the object OBJ. FC (fully connected) means that each element of each layer in the 2D CNN is connected to each element of the next layer, and is given weights. The output of FC2 has 10 nodes corresponding to 10 kinds of motion performed by the object OBJ. Subsequently, a software maximization layer SM3 (SoftMax layer) can limit values output by the 10 nodes between 0 and 1, and the sum of the values is 1. Finally, the 2D CNN predicts ten candidate object motions to belong to which result 131.

When training the dynamic gesture recognition unit 130, in addition to using the commonly used objective function "Cross-Entropy" for classification problems, the present invention also adds another objective function "Center Loss", which is used in a relatively small sample difference. It can prevent from overfittings of the neural network during the training process, and data points of the same gesture are aggregated together to further improve the overall accuracy of unknown samples.

The second processing module 105 can be applied to the output voting system 140, which is responsible for processing the results generated by the dynamic gesture recognition unit 130 at different time by hard-voting (Hard-Voting) method. The recognition results of gestures at different time are counted and output after selection, the system can stabilize the results of the present invention and eliminate misjudgments caused due to certain time points.

Figure 5:
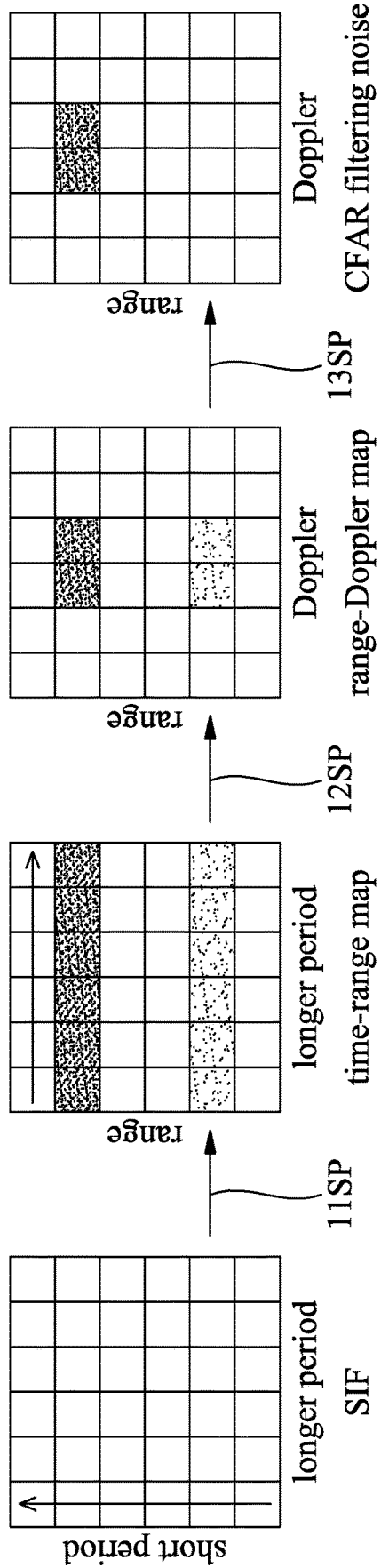
FIG. 5 is a schematic diagram showing a frame on a plane corresponding to a mixed signal after being processed into data according to a preferred embodiment of the present invention.

Please refer to FIG. 5, which is a schematic diagram showing a frame, formed on a plane, corresponding to the mixed signal SIF after being processed into data according to a preferred embodiment of the present invention. Please refer to FIG. 1B and FIG. 5. The at least one antenna 102T, 102R is configured to send a first signal ST to detect the object OBJ, and receives a second signal SR fed back by the object OBJ. The first signal ST and the second signal SR can be mixed to form the mixed signal SIF by the mixer 107 at a receiving end. The first signal ST can be a sweep frequency signal CHP and can be generated by an oscillator 106. For example, the mixer 107 is coupled to the transmitting antenna 102T, the receiving antenna 102R, the oscillator 106 and the analog digital conversion unit 1031. The 2D convolution model 104 is coupled to the dynamic gesture recognition unit 130 and the second processing module 105.

Continuing from the above, the first processing module 103 performs a first-first sub-processing 11SP on the mixed signal SIF to obtain the first feature information DIF1, wherein the first-first sub-processing 11SP performs a fast Fourier transform (FFT) on the mixed signal SIF in a short period to obtain the first characteristic information DIF1. For example, the first characteristic information DIF1 includes a range information (e.g. a distance information) between the object OBJ and the millimeter wave radar 101. The second processing module 105 performs a first-second sub-processing 12SP on the mixed signal SIF to obtain the second characteristic information DIF2, wherein the first-second sub-processing 12SP performs FFT on the mixed signal SIF a longer period to obtain the second characteristic information DIF2. For example, the second characteristic information DIF2 includes an azimuth information between the object OBJ and the millimeter-wave radar 101.

The horizontal axis of the range-Doppler diagram shown in FIG. 5 represents the motion state between the object OBJ and the at least one antenna 102T, 102R; and filtering noise by using the first processing module 103 of CFAR includes filtering out the static background information, so as to obtain a dynamic information of the object OBJ. The azimuth angle information can be obtained by estimating the spacing between the plurality of antennas and the range (e.g., distance) between each antenna and the object.

Figure 6:
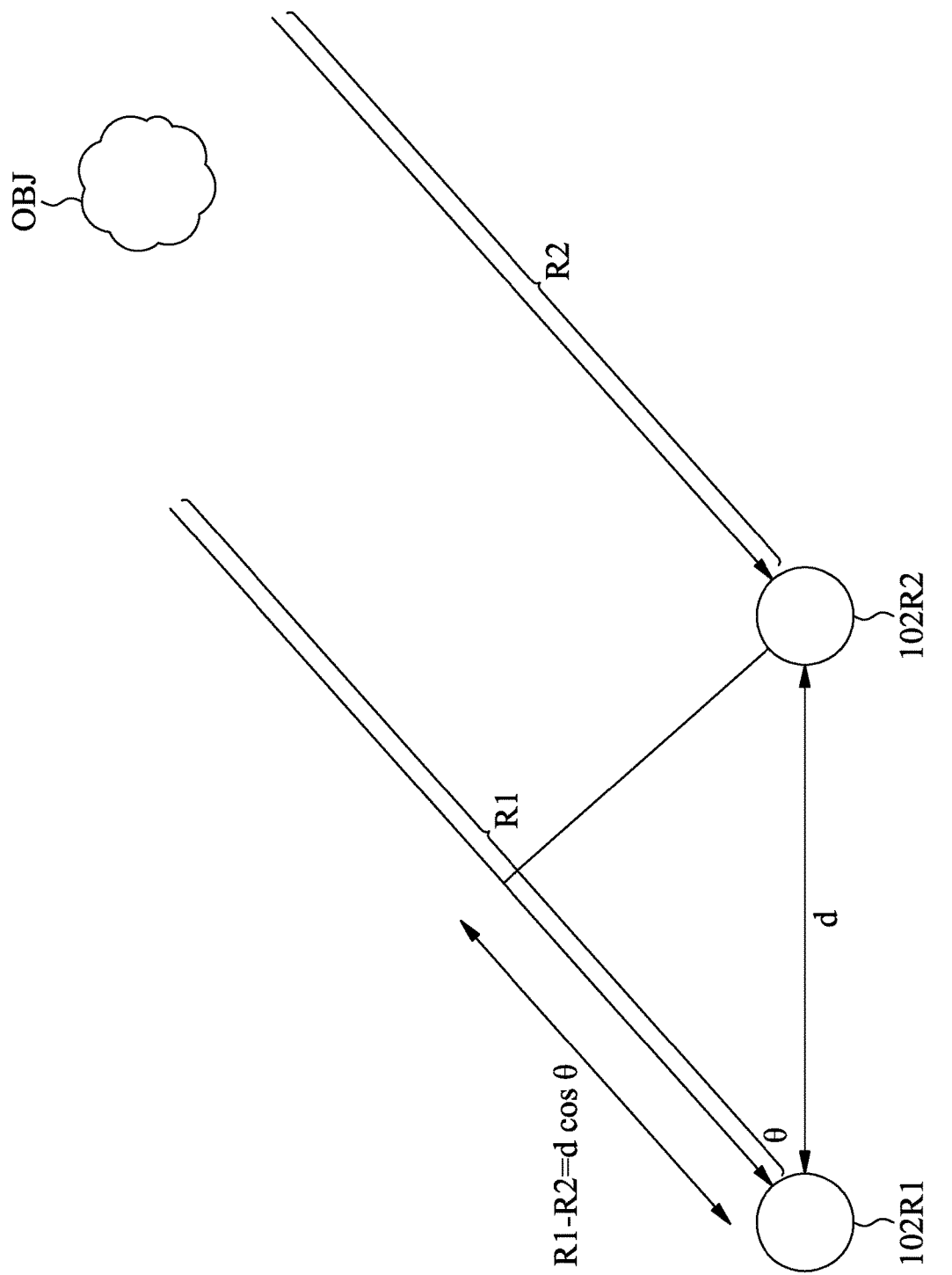
FIG. 6 is a schematic diagram showing the estimation of the azimuth angle according to a preferred embodiment of the present invention.

Please refer to FIG. 6, which is a schematic diagram showing the estimation of the azimuth angle θ according to a preferred embodiment of the present invention. The distance between the receiving antenna 102R1 and the other receiving antenna 102R2 is equal to d. A range between the receiving antenna 102R1 and the object OBJ, and a ranges between the other receiving antenna 102R2 and the object OBJ are R1 and R2 respectively. θ represents the azimuth angle between the receiving antenna 102R1 and the object OBJ, so that the range difference between adjacent antennas is represented by R1−R2=d*cos θ. The distance d can be pre-designed and known, and the ranges R1, R2 can be obtained after the first FFT transformation of the mixed signal SIF, so cos θ=(R1−R2)/d, and θ=cos⁻¹[(R1−R2)/d]. However, the azimuth information of the object OBJ includes the background noise, and the background noise needs to be filtered out to obtain the azimuth information that does not contain the background noise and only contain the azimuth angle information of the object OBJ. In the first-second sub-processing 12SP, the first-second sub-processing 12SP can filter out the background noise of the azimuth angle information of the object OBJ, so as to obtain the processed azimuth angle information only containing that of the object OBJ.

Please refer to FIG. 1A, FIG. 1B, and FIGS. 2-4. The first processing module 103 starts to detect the motion state of the object OBJ after a predetermined number K of the plurality of frames FRMS are obtained. The second processing module 105 includes an object detection mask unit 120, which uses a time sliding window TSW to mask the plurality of frames FRMS, so as to obtain a set of the plurality of consecutive candidate frames FRMS(t1)-FRMS(tn), each of which has the temporal position feature TPC over time. The second processing module 105 includes an output voting system 140, which uses a majority vote to determine which object motion state the set of the plurality of consecutive frames FRMS(t1)-FRMS(tn) belong to.

It is worth noting that the input of the traditional 2D CNN is equal to information of [channel, width, height], which corresponds to [RGB, azimuth, range], and does not contain time information. However, the 2D CNN of the present invention discards the RGB information, using [time, azimuth, range] instead, which includes time information, so the trajectory of the motion state of the detected object OBJ with the time function can be displayed on the screen, and the demand for computation can be greatly reduced. Taking the preferred embodiment of the invention as an example, the trajectory of horizontal movement represents the change of the azimuth angle, and the trajectory of vertical movement represents the change of the range. In addition, the conventional 3D CNN uses a three-dimensional kernel to extract features, and different kernels are used to extract color features; while the 2D CNN of the present invention uses a two-dimensional kernel to extract time and position features. Temporal features are extracted among different cores, and the computational complexity of the 2D CNN is more suitable for applications of embedded devices.

Figure 7:
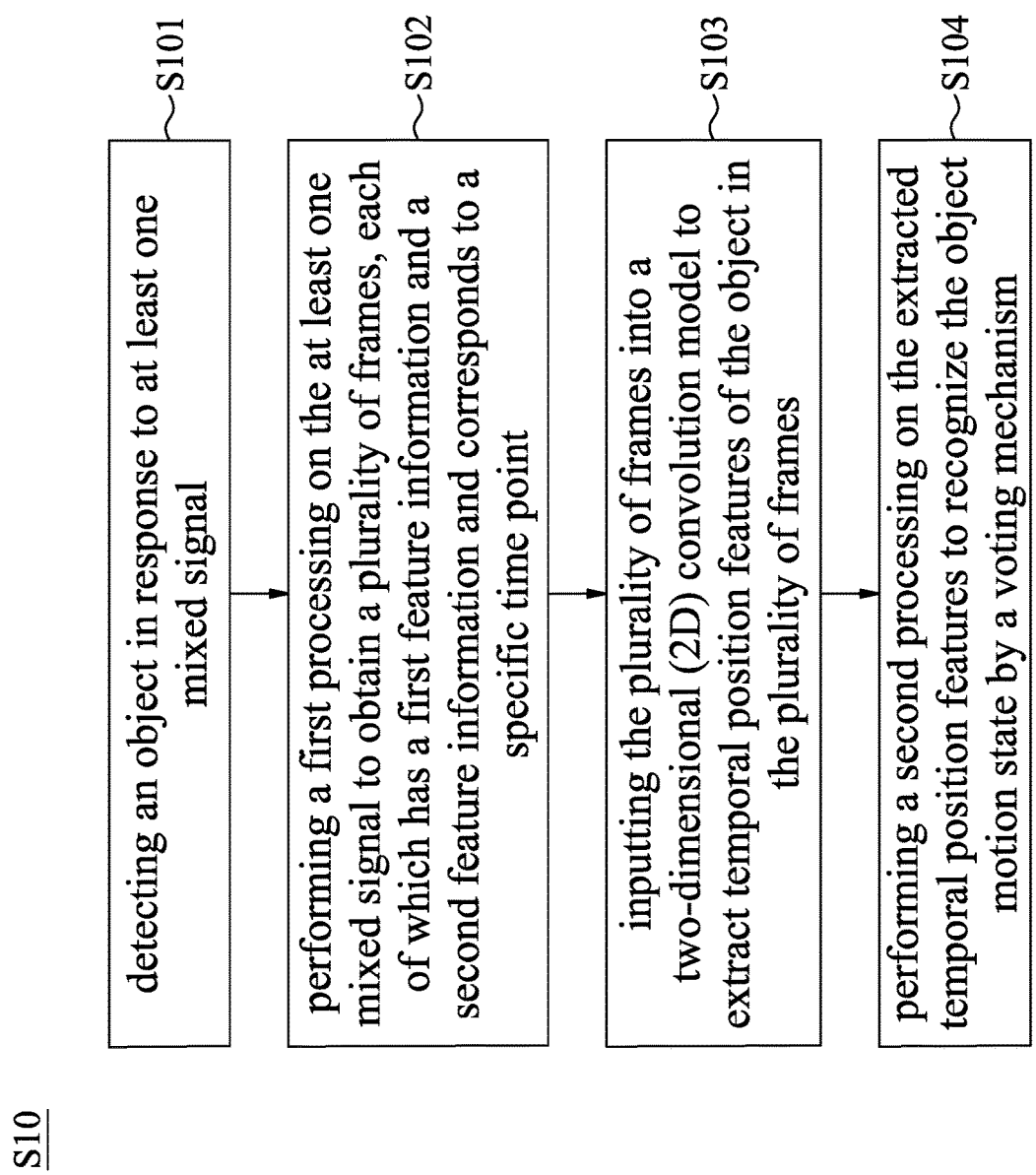
FIG. 7 is a schematic diagram showing a method of real-time recognizing an object motion state by using a millimeter wave radar according to a preferred embodiment of the present disclosure.

To sum up, it can be concluded that a method S10 of real-time recognizing an object motion state by using a millimeter wave radar according to a preferred embodiment of the present disclosure is provided as shown in FIG. 7. The method S10 includes the following steps: Step S101, an object is detected in response to at least one mixed signal. Step S102, a first processing is performed on the at least one mixed signal to obtain a plurality of frames, each of which has a first feature information and a second feature information and corresponds to a specific time point. Step S103, the plurality of frames are input into a two-dimensional (2D) convolution model to extract temporal position features of the object in the plurality of frames. Step S104, a second processing is performed on the extracted temporal position features to recognize the object motion state by a voting mechanism.

In any embodiment of the present disclosure, the method S10 further includes the following steps of: A first signal ST is sent to detect the object OBJ; a second signal SR fed back from the object is received; and the first signal ST and the second signal SR are mixed to form the at least one mixed signal SIF. In addition, a first-first sub-processing 11SP is performed by performing a fast Fourier transform (FFT) on each of the at least one mixed signal SIF within a relatively shorter period to obtain the first feature information including a range information between the object OBJ and the millimeter wave radar 101.

In any embodiment of the present disclosure, the method S10 further includes a step of: performing a first-second sub-processing SSP1 by performing a fast Fourier transform (FFT) on each of the at least one mixed signal SIF in a relatively longer period to obtain the second feature information including azimuth information between the object OBJ and the millimeter wave radar 101.

In any embodiment of the present disclosure, each the at least one mixed signal SIF includes a sweep transmitting signal and a sweep receiving signal.

In any embodiment of the present disclosure, the temporal position feature TPC of the object OBJ includes a range information and an azimuth angle information shown in each of the plurality of frames FRM between the object OBJ and the millimeter wave radar 101.

In any embodiment of the present disclosure, a color dimension in the 2D convolutional model is replaced by a time dimension.

In any embodiment of the present disclosure, the millimeter wave radar 101 has a plurality of antennas. The method S10 further includes the following steps: The FFT is performed on each the at least one mixed signal SIF within a first period to obtain each the first feature information; performing the FFT on each the at least one mixed signal SIF within a second period to obtain a plurality of motion state information between each of the antennas and the object OBJ. The plurality of motion state information are used to filter a static background information to obtain a dynamic information of the object OBJ. In addition, an azimuth angle information between the millimeter wave radar 101 and the object OBJ is estimated based on each of the first feature information and the corresponding dynamic information.

In any embodiment of the present disclosure, the method S10 further includes the following steps: To recognize the object motion state is started after having obtained a predetermined number of the plurality of frames (K frames). The plurality of frames (M frames) are masked using a temporal sliding window TSW to obtain a set of plurality of consecutive frames FRMS(t1)~FRMS(tn) for obtaining the temporal position features. In addition, a majority vote is used to determine which object motion state the set of plurality of consecutive frames FRMS(t1)-FRMS(tn) belong to.

To sum up, it can be concluded that a millimeter wave radar 101 as shown in FIG. 1B includes at least one antenna 102T, 102R, a first processing module 103, a two-dimensional (2D) convolution model 104, and a second processing module 105. The at least one antenna 102T, 102R is configured to receive at least one mixed signal SIF to detect an object OBJ. The first processing module 103 is coupled to the at least one antenna 102T, 102R for performing a first processing on the at least one mixed signal SIF to obtain a plurality of frames FRMS as shown in FIG. 2, each of which has a first feature information and a second feature information and corresponds to a respective time point. The two-dimensional (2D) convolution model 104 is coupled to the first processing module 103, and receives the plurality of frames FRMS to extract temporal position features TPC of the object OBJ in the plurality of frames FRMS. The second processing module 105 performs a second processing on the extracted temporal position features TPC, wherein the second processing module 105 uses a voting mechanism to recognize an object motion state of the object OBJ.

In any embodiment of the present disclosure, the at least one antenna 102T, 102R sends a first signal ST to detect the object OBJ, receives a second signal SR fed back from the object OBJ, and mixes the first signal ST and the second signal SR to form the at least one mixed signal SIF.

In any embodiment of the present disclosure, the first processing module 103 performs a first-first sub-processing 11SP by performing a Fast Fourier Transform (FFT) on each the at least one mixed signal SIF within a relatively shorter period to obtain the first feature information including a range information between the object OBJ and the millimeter wave radar 101.

In any embodiment of the present disclosure, the first processing module 103 performs a first-second sub-processing 12SP by performing an FFT on each the at least one mixed signal SIF within a relatively longer period to obtain the second feature information including an azimuth angle information between the object OBJ and the millimeter wave radar 101.

In any embodiment of the present disclosure, the first processing module 103 starts to recognize the object motion state after having obtained a predetermined number of the plurality of frames, such as K frames as shown in FIG. 4.

In any embodiment of the present disclosure, the second processing module 105 includes an object detection mask unit 120, which uses a time sliding window TSW to mask the plurality of frames to obtain a set of plurality of consecutive frames FRMS(t1)-FRMS(tn) for obtaining the temporal position feature TPC. The second processing module 105 includes an output voting system 140 that uses a majority vote to determine which object motion state the set of plurality of consecutive frames FRMS(t1)-FRMS(tn) belong to.

(Adding for detail) Alternatively, the first processing module 103 includes an object detection mask unit 120, which uses a time sliding window TSW to mask the plurality of frames to obtain a set of plurality of consecutive frames FRMS(t1)-FRMS(tn) for obtaining the temporal position feature TPC. The object detection mask unit 120 performs masking by using a time sliding window TSW before frames are input into the 2D convolution model 104, which can be suitable for real time processing. If the object detection mask unit 120 is arranged in the second processing module 105, all the set of plurality of consecutive frames FRMS(t1)-FRMS(tn) should be input into the 2D convolution model 104 before performing masking.

Figure 8:
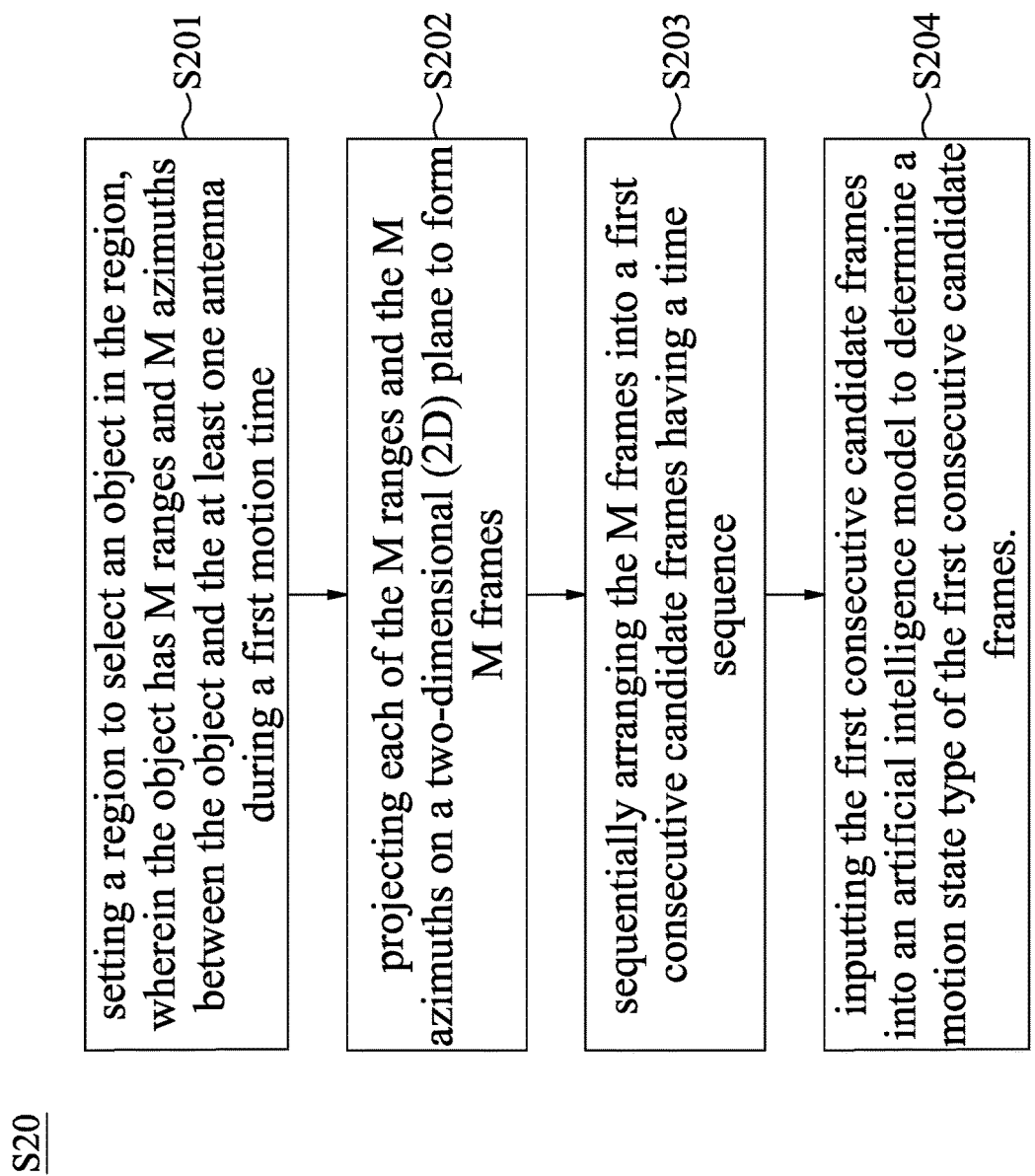
FIG. 8 is a schematic diagram showing a method for recognizing a motion state of an object by using a millimeter wave radar having at least one antenna according to another preferred embodiment of the present disclosure.

Please refer to FIG. 8, which is a schematic diagram showing a method S20 for recognizing a motion state of an object by using a millimeter wave radar having at least one antenna according to another preferred embodiment of the present disclosure. The method S20 includes the following steps: Step S201, a region is set to select an object in the region, wherein the object has M ranges and M azimuths between the object and the at least one antenna during a first motion time. Step S202, each of the M ranges and the M azimuths is projected on a two-dimensional (2D) plane to form M frames. Step S203, the M frames are sequentially arranged into a first consecutive candidate frames having a time sequence. Step S204, the first consecutive candidate frames are input into an artificial intelligence model to determine a motion state type of the first consecutive candidate frames.

In any embodiment of the present disclosure, the method S20 further includes the following steps: A sliding window is used to capture M ranges and M azimuths that the object has in an n-th motion time. The projecting and the arranging steps are repeated to form an n-th consecutive candidate frames, wherein n=2, . . . , N, and N≥2. Each of the second to N-th consecutive candidate frames is input into the artificial intelligence model to determine a motion state type corresponding to each of the second to N-th consecutive candidate frames, wherein the artificial intelligence model includes a two-dimensional convolution model. In addition, which one motion state type has the highest occurrences among the motion state types corresponding to the first to Nth consecutive candidate frames is identified, so as to recognize the object motion state as the identified motion state type having the highest occurrences.

In any embodiment of the present disclosure, the method S20 further includes a step of: starting to recognize the object motion state after having obtained predetermined K frames of the M frames.

In any embodiment of the present disclosure, the method S20 further includes the following steps: The object is detected by receiving a mixed signal formed by mixing a sweep transmitting signal transmitted to and a sweep receiving signal received from the object. A first processing is performed on the mixed signal to obtain the M ranges and the M azimuths. In addition, a temporal position feature of the object in each of the M frames is extracted, wherein the artificial intelligence model includes the two-dimensional convolution model having an input parameter and the input parameter includes a time parameter.

In any embodiment of the present disclosure, the temporal position feature of the object includes a range information and an azimuth angle information shown in the plurality of frames between the object and the millimeter wave radar. A color dimension in the 2D convolutional model is replaced by a time dimension corresponding to the time parameter.

In any embodiment of the present disclosure, the millimeter wave radar has a plurality of antennas. The method S20 further includes the following steps: An FFT is performed on each mixed signal within a first period to obtain each of the M ranges. The FFT is performed on each mixed signal within a second period to obtain a plurality of motion state information between each of the antennas and the object. The plurality of motion state information is used to filter a static background information to obtain a dynamic information of the object. The M azimuths are estimated based on the M ranges and the dynamic information.

Figure 9:
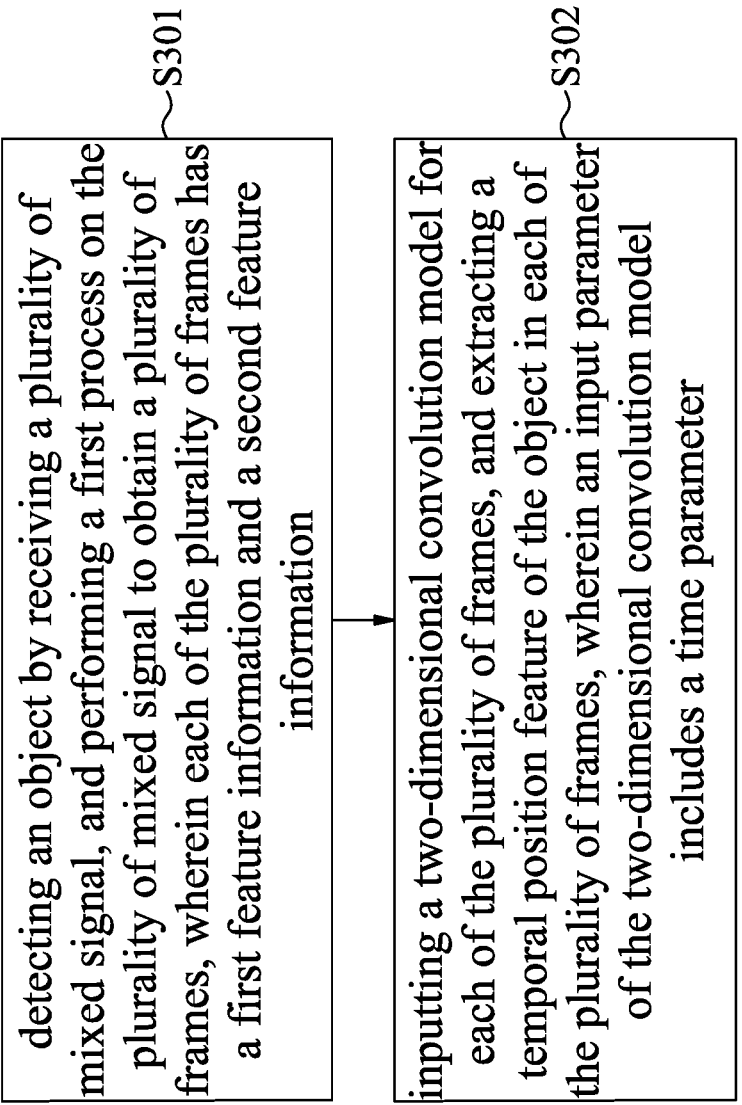
FIG. 9 is a schematic diagram of a method for recognizing an object motion state according to another preferred embodiment of the present invention.

Please refer to FIG. 9, which is a schematic diagram showing a method S30 for recognizing an object motion state according to another preferred embodiment of the present invention. The method S30 includes the following steps: Step S301, an object is detected by receiving a plurality of mixed signal, and performing a first process on the plurality of mixed signal to obtain a plurality of frames, wherein each of the plurality of frames has a first feature information and a second feature information. Step S302, a two-dimensional convolution model is input for each of the plurality of frames, and a temporal position feature of the object in each of the plurality of frames is extracted, wherein an input parameter of the two-dimensional convolution model includes a time parameter.

Please refer to the following Tables 1-2, which are the data tables of the excellent efficacy of the present invention.

TABLE 1

| AI Module | 2D CNN (present invention) | 3D CNN | CNN + RNN | CNN + LSTM |
|---|---|---|---|---|
| Frame per second | 354.69 | 41.76 | 9.95 | 9.26 |
| Time per frame | 2.82 ms | 23.95 ms | 100.51 ms | 108.05 ms |

TABLE 2

| Layer | 2D CNN (present invention) | 3D CNN | CNN + RNN | CNN + LSTM |
|---|---|---|---|---|
| input | 36 × 21 × 21 | 1 × 36 × 21 × 21 | 1 × 36 × 21 × 21 | 1 × 36 × 21 × 21 |
| Conv 1 | 16 × 10 × 10 | 16 × 12 × 10 × 10 | 16 × 36 × 10 × 10 | 16 × 36 × 10 × 10 |
| Conv 2 | 32 × 05 × 05 | 32 × 04 × 05 × 05 | 32 × 36 × 05 × 05 | 32 × 36 × 05 × 05 |
| Conv3 | 64 × 02 × 02 | 64 × 02 × 02 × 02 | 64 × 36 × 02 × 02 | 64 × 36 × 02 × 02 |
| FC 1 | 64 | 64 | 36 × 64 | 36 × 64 |
| FC 2 | 32 | 32 | 36 × 32 | 36 × 32 |
| FC 3 | 10 | 10 | 36 × 10 | 36 × 10 |
| Encode | — | — | 10 | 10 |
| Parameter | 21.83K | 66.99K | 21.61K | 22.27K |
| Calculation amount | 0.83M | 31.74M | 23.19M | 23.22M |

It can be seen that the 2D CNN used in the present invention can output more pictures than other artificial intelligence modules in an embedded system that does not require high computing power.

In any embodiment of the present disclosure, a recognizing method for the object motion state by using a millimeter-wave radar is provided, and the mixed signal includes a sweep frequency transmitting signal and a sweep frequency receiving signal. The time position feature of the object includes a range information and an azimuth angle information indicated in the plurality of frames between the object and the millimeter-wave radar at different time points. A color dimension in the two-dimensional convolutional model is replaced by a time dimension. The method uses a millimeter-wave radar having a plurality of antennas. The method further includes the following steps: A voting mechanism is used to perform a second process on the extracted time position feature to identify an object motion state after a masking technique is performed. An FFT is performed on each mixed signal with a first cycle to obtain each first feature information. The FFT is performed on each mixed signal with a second cycle to obtain the plurality of object motion state information between the antenna and the object. A static background information is filtered by using the plurality of motion state information to obtain a motion information of the object. In addition, the azimuth information between the millimeter wave radar and the object according to each first feature information and the motion information.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

The invention claimed is:

1. A method of real-time recognizing an object motion state by using a millimeter wave radar, comprising the following steps:
   detecting an object in response to at least one mixed signal by receiving a mixed signal formed by mixing a sweep transmitting signal transmitted to the object and a sweep receiving signal received from the object;
   performing a first processing on the at least one mixed signal to obtain M frames, each of which has a first feature information and a second feature information and corresponds to a specific time point, wherein the first feature information includes M ranges, and the second feature information includes M azimuths;
   inputting the M frames into a two-dimensional (2D) convolution model to extract a temporal position feature of the object in each of the M frames, wherein the 2D convolution model includes an input parameter including a time parameter; and
   inputting the M frames into a two-dimensional (2D) convolution model to extract a temporal position features of the object in each of the M frames, wherein the 2D convolution model includes an input parameter including time parameter; and
   performing a second processing on the extracted temporal position features to recognize the object motion state by a voting mechanism.

2. The method as claimed in claim 1, further comprising steps of:
   sending a first signal to detect the object, receiving a second signal fed back from the object, and mixing the first signal and the second signal to form the at least one mixed signal; and
   performing a first first sub-processing by performing a fast Fourier transform (FFT) on each of the at least one mixed signal within a relatively shorter period to obtain the first feature information including a range information between the object and the millimeter wave radar.

3. The method claimed in claim 2, further comprising a step of:
   performing a first second sub-processing by performing a fast Fourier transform (FFT) on each of the at least one mixed signal in a relatively longer period to obtain the second feature information including azimuth information between the object and the millimeter wave radar.

4. The method as claimed in claim 1, wherein each the at least one mixed signal includes a sweep transmitting signal and a sweep receiving signal.

5. The method as claimed in claim 1, wherein the temporal position feature of the object includes a range information and an azimuth angle information shown in each of the plurality of frames between the object and the millimeter wave radar.

6. The method as claimed in claim 1, wherein;
   the 2D convolution model includes a time dimension associated with the time parameter, an azimuth dimension and a range dimension;
   a first trajectory of horizontal movement of the object represents a first change of the azimuth dimension, and a second trajectory of vertical movement of the object represents a second change of the range dimension; and
   an another 2D convolution model different from the 2D convolution model includes a color dimension, a width dimension and a height dimension, and excludes a time dimension.

7. The method as claimed in claim 1, wherein:
   the millimeter wave radar has a plurality of antennas, and the method further comprises steps of:
   performing the FFT on each the at least one mixed signal within a first period to obtain each the first feature information;
   performing the FFT on each the at least one mixed signal within a second period to obtain a plurality of motion state information between each of the antennas and the object;
   using the plurality of motion state information to filter a static background information to obtain a dynamic information of the object; and
   estimating an azimuth angle information between the millimeter wave radar and the object based on each of the first feature information and the corresponding dynamic information.

8. The method as claimed in claim 1, further comprising steps of:
   starting to recognize the object motion state after having obtained a predetermined number of the plurality of frames;
   masking the plurality of frames using a temporal sliding window to obtain a set of plurality of consecutive frames for obtaining the temporal position features; and
   using a majority vote to determine which object motion state the set of plurality of consecutive frames belong to.

9. A millimeter wave radar comprising:
   at least one antenna configured to receive at least one mixed signal to detect an object by receiving a mixed signal formed by mixing sweep transmitting signal transmitted to the object and a sweep receiving signal received from the object;
   a first processing module coupled to the at least one antenna for performing a first processing on the at least one mixed signal to obtain M frames, each of which has a first feature information and a second feature information and corresponds to a respective time point, wherein the first feature information includes M ranges, and the second feature information includes M azimuths;
   a two-dimensional (2D) convolution model coupled to the first processing module, and receiving the M frames to extract a temporal position features of the object in each of the M frames, wherein the 2D convolution model has an input parameter including a time parameter; and
   a second processing module performing a second processing on the extracted temporal position features, wherein the second processing module uses a voting mechanism to recognize an object motion state of the object.

10. The millimeter wave radar as claimed in claim 9, wherein the at least one antenna sends a first signal to detect the object, receives a second signal fed back from the object, and mixes the first signal and the second signal to form the at least one mixed signal.

11. The millimeter wave radar as claimed in claim 9, wherein the first processing module performs a first first sub-processing by performing a Fast Fourier Transform (FFT) on each the at least one mixed signal within a relatively shorter period to obtain the first feature information including a range information between the object and the millimeter wave radar.

12. The millimeter wave radar as claimed in claim 9, wherein the first processing module performs a first second sub-processing by performing an FFT on each the at least one mixed signal within a relatively longer period to obtain the second feature information including an azimuth angle information between the object and the millimeter wave radar.

13. The millimeter wave radar as claimed in claim 9, wherein the first processing module starts to recognize the object motion state after having obtained a predetermined number of the plurality of frames.

14. The millimeter wave radar as claimed in claim 9, wherein
the first processing module includes an object detection masking unit, which uses a time sliding window to mask the plurality of frames to obtain a set of plurality of consecutive frames for obtaining the temporal position feature; and
the second processing module includes an output voting system that uses a majority vote to determine which object motion state the set of plurality of consecutive frames belong to.

15. A method for recognizing a motion state of an object by using a millimeter wave radar having at least one antenna, the method comprising the following steps of:
setting a region to select an object in the region, wherein the object has M ranges and M azimuths between the object and the at least one antenna during a first motion time;
performing a first processing on a mixed signal to obtain the M ranges and the M azimuths; wherein the mixed signal is formed by mixing a sweep transmitting signal transmitted to the object and a sweep receiving signal received from the object;
projecting each of the M ranges and the M azimuths on a two-dimensional (2D) plane to form M frames;
sequentially arranging the M frames into a first consecutive candidate frames having a time sequence; and
inputting the first consecutive candidate frames into an artificial intelligence model and extracting a temporal position feature of the object in each of the M frames to determine a motion state type of the first consecutive candidate frames, wherein the artificial intelligence model includes a two-dimensional convolution model having an input parameter and the input parameter includes a time parameter.

16. The method as claimed in claim 15, further comprising steps of:
using a sliding window to capture M ranges and M azimuths that the object has in an n-th motion time;
repeating the projecting and the arranging steps to form an n-th consecutive candidate frames, wherein n=2, . . . , N, and N≥2;
inputting each of the second to N-th consecutive candidate frames into the artificial intelligence model to determine a motion state type corresponding to each of the second to N-th consecutive candidate frames, wherein the artificial intelligence model includes a two-dimensional convolution model; and
identifying which one motion state type has the highest occurrences among the motion state types corresponding to the first to N-th consecutive candidate frames, so as to recognize the object motion state as the identified motion state type having the highest occurrences.

17. The method as claimed in claim 16, further comprising steps of:
starting to recognize the object motion state after having obtained predetermined K frames of the M frames.

18. The method as claimed in claim 15, wherein:
the temporal position feature of the object includes a range information and an azimuth angle information shown in the plurality of frames between the object and the millimeter wave radar;
the artificial intelligence model includes a 2D convolution model;
the 2D convolution model includes a time dimension, an azimuth dimension and a range dimension;
a first trajectory of horizontal movement of the object represents a first change of the azimuth dimension, and a second trajectory of vertical movement of the object represents a second change of the range dimension; and
an another 2D convolution model different from the 2D convolution model includes a color dimension, a width dimension and a height dimension, and excludes a time dimension corresponding to the time parameter.

19. The method as claimed in claim 15, wherein:
the millimeter wave radar has a plurality of antennas, and the method further comprises steps of:
performing an FFT on each mixed signal within a first period to obtain each of the M ranges;
performing the FFT on each mixed signal within a second period to obtain a plurality of motion state information between each of the antennas and the object;
using the plurality of motion state information to filter a static background information to obtain a dynamic information of the object; and
estimating the M azimuths based on the M ranges and the dynamic information.

* * * * *